United States Patent [19]

Dwinell

[11] Patent Number: 5,221,028
[45] Date of Patent: Jun. 22, 1993

[54] PAIL CLOSURE WITH SPOUT AND IMPROVED SEAL

[75] Inventor: Davis B. Dwinell, Carol Stream, Ill.

[73] Assignee: Royal Packaging Industries Van Leer B.V., Amstelveen, Netherlands

[21] Appl. No.: 962,858

[22] Filed: Oct. 19, 1992

Related U.S. Application Data

[62] Division of Ser. No. 819,969, Jan. 13, 1992.

[51] Int. Cl.⁵ ............................................... F16L 5/00
[52] U.S. Cl. ...................................... 222/529; 285/21; 285/201
[58] Field of Search ............... 222/529, 530; 220/600, 220/601, DIG. 31, 363; 285/21, 201, 284

[56] References Cited

U.S. PATENT DOCUMENTS

| | | | |
|---|---|---|---|
| 2,464,541 | 3/1949 | Young | 285/201 |
| 3,353,849 | 11/1967 | Laurizio | 285/21 |
| 3,873,132 | 3/1975 | Czerwiak | 285/21 |
| 4,129,236 | 12/1978 | Wrycraft et al. | 285/201 X |
| 4,231,488 | 11/1980 | Ward et al. | 285/201 X |
| 4,632,282 | 12/1986 | Nagashima | 222/529 |

Primary Examiner—Gregory L. Huson

[57] ABSTRACT

A two piece plastic nozzle and overlying screw cap closure assembly in combination with a plastic pail cover wherein the nozzle has a cylindrical body portion which is inserted into a cover opening to form a friction fit therewith. The overlying screw cap is then rigidly supported as a sonic welding horn is brought into axial engagement with the protruding nozzle body portion. Energization of the sonic welding horn causes the nozzle body portion to soften and deform radially outwardly into a circumferentially enlarged rivet connection. Continued axial displacement of the sonic welding horn creates a plastic bond about the periphery of the rivet connection so as to close off any leakage path therearound. At the same time any radial dispersion of plastic material resulting from the bonding process is locally contained about the rivet connection periphery.

4 Claims, 1 Drawing Sheet

PAIL CLOSURE WITH SPOUT AND IMPROVED SEAL

This is a division of patent application Ser. No. 07/819,969 filed Jan. 13, 1992 entitled "Pail Closure Application Method".

BACKGROUND OF THE INVENTION

This invention is directed to the combination of a synthetic plastic closure assembly and a synthetic plastic pail cover.

The current pressing need to eliminate plastic packaging materials from the solid waste stream has prompted an in-depth cost analysis the most effective approach for getting industrial size plastic pails converted into post consumer regrind plastic resin. These pails, by and large, are in the five gallon size range and consist of a generally cylindrical vessel open at one end to which a cover is mechanically applied after filling. The cover, in turn, has a pouring opening to which a closure assembly is secured to enable subsequent decanting and reclosing. Pail closures normally employed in this environment are of the type shown in U.S. Pat. No. 4,568,006 dated Feb. 4, 1986 and consist of a plastic nozzle embodying a nestable pouring spout which threadedly receives an overlying screw cap. The nozzle is further provided with a circumferential sealing flange secured to a neck surrounding the pail cover opening by means of a rigid metal crimping ring. While, this type pail closure construction has proven highly successful in the past, it has the serious shortcoming for present day needs of incorporating a metal component in an otherwise all plastic construction. The additional labor required to remove this metal ring so that the pail cover can be accepted into the plastic recycling process is a significant negative factor. This drawback has prompted the search for an effective alternative all plastic closure assembly pail cover combination utilizing one of the known plastic to plastic bonding techniques. Although such known bonding techniques are numerous including spin welding, sonic welding, hot plate welding and induction welding, none have to date provided a completely satisfactory answer to the above described problem at hand.

To be successful such alternative construction must embody a closure pail cover joint capable of withstanding all of the commonly accepted and closely regulated performance criteria for shipping hazardous liquid products. These criteria would include. static and hydraulic internal pressure build up, drop test impact resistance at both high and low temperature extremes, environmental stress crack resistance under widely varying conditions and the like. These criteria, moreover, must be met with a high degree of consistency and repeatability. Each of the above enumerated known plastic to plastic bonding techniques has one or more serious limitations when applied to the instant situation. For example, most commonly employed plastic to plastic bonding techniques are largely ineffective when practiced with dissimilar plastic melt characteristics at the bond interface. That is to say, such arrangements in and of themselves will not provide the necessary joint strength and sealability. Induction welding, of course, requires the introduction of a metallic contaminant which is precisely what the invention seeks to avoid. Considerations of equipment cost and fabrication cycle times are also of importance in deriving a truly workable system.

SUMMARY OF THE INVENTION

The closure assembly pail cover combination of the invention overcomes the above mentioned prior art deficiencies by effectively joining a two piece plastic closure assembly to a suitably formed opening in a plastic pail cover. The closure assembly consists of a nozzle member having a tubular body surrounded by a circumferentially enlarged flange or collar. The nozzle member further incorporates a nestable pouring spout to which an overlying screw cap is threadedly engaged. In accordance with the invention the nozzle body is pushed into the pail cover opening so as to seat the circumferentially enlarged nozzle collar therearound. The closure pail cover preassembly is then rigidly supported by seating energized welding horn is axially displaced toward the cap nest so as to engage the nozzle body end portion and deform said end portion radially outwardly into a circumferentially enlarged annular rivet head. Continued axial displacement of the welding horn fuses the rivet head perimeter to the pail cover underface creating a permanent liquid tight seal. This closure application is seen as rather a hybrid process whereby the rivet forming phase imparts high strength and tamper resistance while the terminal phase creates a plastic to plastic bond effectively sealing off any possible leakage path at the joint interface. The resulting closure pail cover joint possesses a high degree of structural integrity and is ideally suited for recycling used pails into post consumer regrind resin. Moreover, the process employs a shortened time cycle compared to other methods and is carried out with available, relatively cost effective equipment.

It is accordingly a principal object of the invention to provide a new synthetic plastic closure assembly synthetic plastic pail cover combination.

Another object is to provide a new integrally bonded closure assembly container wall combination.

A further object is to provide a clean, high strength plastic to plastic closure container wall sealed joint Other and more detailed objects will in part be obvious and in part pointed out as the description taken in conjunction with the accompanying drawing proceeds In the drawings.

Figure 1:
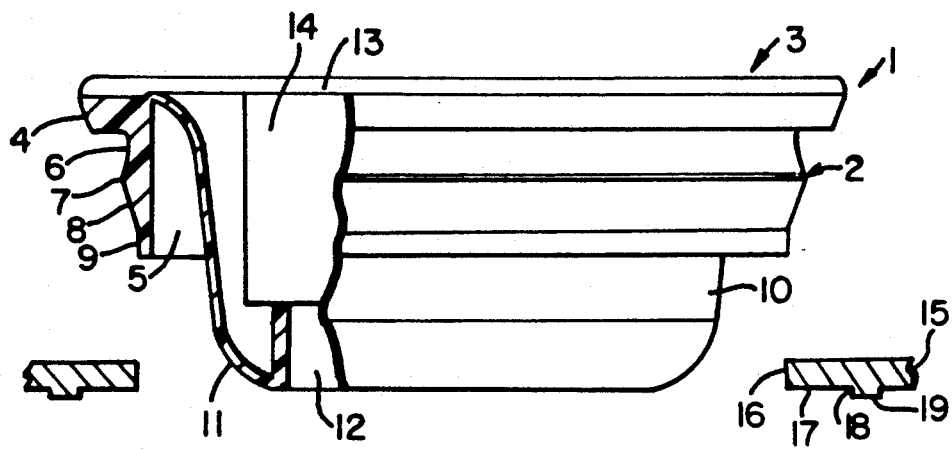
FIG. 1 is a part sectional part elevational exploded view of the closure assembly and container wall opening prior to securing in accordance with the invention.

The container closure assembly generally indicated at numeral 1 in FIG. 1 is seen to consist of a nozzle 2 molded of low density polyethylene plastic resin and an overlying screw cap 3 molded of high density polyethylene plastic resin. The nozzle 2 is formed with a circumferentially extending flange or collar 4. A cylindrical nozzle throat 5 extends from the undersurface of the flange 4 having a cylindrical seat 6, a retaining bead 7, a conical lead in surface 8 and a cylindrical pilot portion 9. The nozzle 2 is further formed with a nestable pouring spout 10 consisting of an outer flexible wall 11 and a rigid inner spout portion 12. Such nestable pouring spouts are well known as shown in U.S. Pat. No. 4,568,0076 dated Feb. 4, 1986. The overlying screw cap 3 is provided with a circumferentially enlarged top wall 13 which bridges the annular void created by the nozzle flexible wall 11 and seats on top of the flange 4 with the spout in retracted or nested position. A cylindrical sidewall 14 depends from the cap top 13 and carries an internal screw thread (not shown) for engagement with the nozzle rigid inner spout portion 12.

The pail cover or lid 15 is disc shaped having a peripheral configuration for engagement with the sidewall of a plastic pail body (not shown). The lid 15 is molded of a high density polyethylene plastic resin normally in a thickness range of 0.060 to 0.100 inches. A pour opening 16 is molded in the lid 15 dimensioned to form a snug interference fit engagement with the nozzle throat cylindrical seat 6. The undersurface 17 of the pail lid 15 immediately surrounding the opening 16 is bordered by an annular step 18 creating a peripheral raised surface 19.

During the pail fabrication the closure assembly 1 is axially displaced toward the pail lid 15 as shown in FIG. 1. After entry of the pilot portion 9 and lead-in surface 8, the pail opening 16 tightly snaps into the nozzle cylindrical seat 6 making a snug interference fit therewith. The top wall 13 of the closure cap 3 is rigidly supported within a cpu shaped nest 20 having a cylindrical sidewall 21 which supports the exterior surface of the pail cover surrounding the closure assembly. Thus, as clearly seen in FIG. 2, the nozzle flange 4 is tightly clamped between the pail cover 15 and the cap top wall 13 all of which is supported by the nest. 20.

Figure 2:
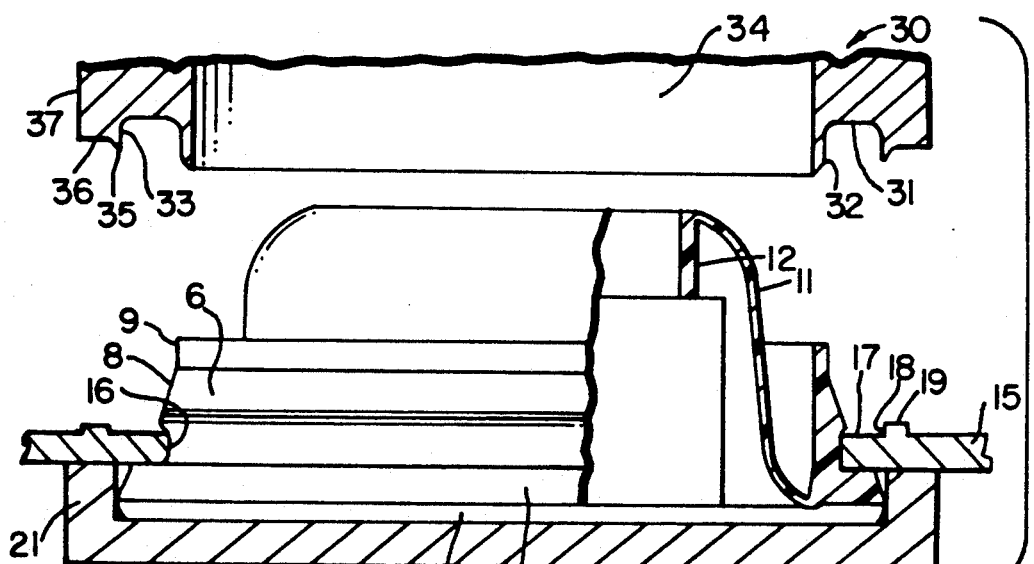
FIG. 2 is a part sectional part elevational view showing the closure assembly and pail opening positioned between the cap nest and welding horn prior to the welding operation.

A sonic welding horn 30 is axially aligned with the nest 20 and formed with a downwardly opening annular channel 31. As also seen in FIG. 2 the channel 31 has a gradually radiused interior surface defined by an inner wall 32 and an outer wall 33. The inner wall 32 extends axially beyond the outer wall and forms a relatively narrow sleeve surrounding the horn interior cylindrical surface 34. The outer wall 33 terminates in a relatively sharp annular rib 35 surrounded by a flat annular end surface 36 which joins the horn exterior cylindrical surface 37.

Figure 3:
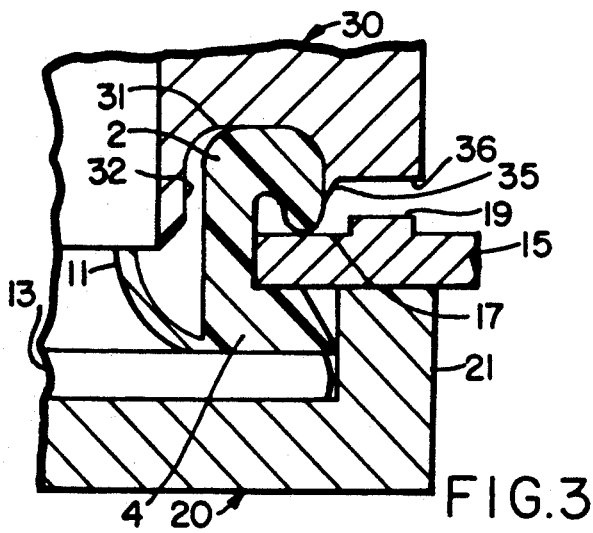
FIG. 3 is similar to FIG. 2 showing an advanced step in the closure application.
Figure 4:
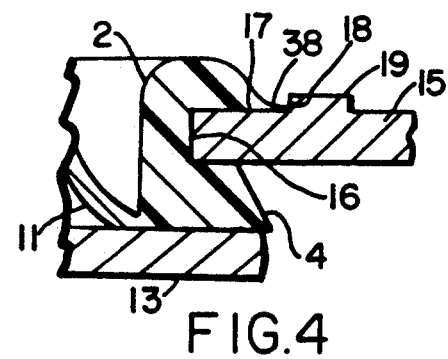
FIG. 4 is a vertical sectional view showing the completed closure container wall joint.

As the insertion operation continues, the sonic welding horn 30 is axially displaced relative to the nest 20 causing the annular channel 31 to engage the end pilot portion 9 of the nozzle throat 2. At this point the sonic horn is activated by means of a power supply generator (not shown) in a conventional manner which instantaneously brings the nozzle pilot portion 9 and lead-in surface portion 8 to an elevated temperature. Continued axial displacement compressing the closure assembly against the nest 20, as seen in FIG. 3, results in a swaging action against the nozzle throat whereby the softened plastic material is deformed radially outwardly so as to overlie the pail cover undersurface 17. At this stage the inner wall 32 of the horn 30 extends into the nozzle throat 5 opposite the cylindrical seat 6 and acts as a baffle against radially inward flashing of plastic resin during the securing operation. The annular rib 35 which serves as an energy concentrator on the horn 30, is at this stage axially spaced from the pail undersurface 17 a distance approximately equal to the axial spacing between the horn annular flat end surface 36 and peripheral raised surface 19 surrounding the pail opening. The final increment of axial displacement of the horn 30 relative to the nest 20 produces the finished closure container wall joint as shown in FIG. 4. This results from the final deformation of the nozzle throat 2 within the sonic horn channel 31. At this point it should be noted a critical relationship exists between the volumetric displacement of the channel 31 and the mass of plastic resin in the nozzle throat extending beyond the cylindrical section 6. This relationship is such that when the horn 30 bottoms out with a predetermined set force on the next 20, the channel 31 is completely filled with molten plastic material. Under these, conditions then a small amount of flash or molten plastic 38 is expelled radially outwardly underneath the horn rib 35 which at the end of the cycle becomes embedded in the expelled plastic and acts as an energy concentrator to bond this residue of material to the cover surface 17. At the same instant the horn end surface 36 contacts the raised annular pail lid surface 19 making a tight seal thereagainst. Here also it can be seen that the annular step 18 on the lid undersurface creates a dam about the peripheral bonding zone so as to contain and localize any residue of expelled resin or flash that occurs at the final stage of the welding cycle. Unless this radial dispersion of melted resin is completely captured, the risk of contaminating the subsequently filled container exists. As clearly seen in FIG. 4 the end result is a completely formed annular rivet head connection possessing a high degree of structural integrity surrounded by a peripheral bonding zone which provides a 360 degree hermetic seal.

The bonding arrangement of the invention while employing sonic energy as a heat source does not sonically weld the parts together in the usual sense where reliance is placed solely on a homogeneous molecular interlocking at the joint interface to achieve a leak proof permanent connection. Instead the securing operation is a hybrid which relies on sonic energy to initially swage the nozzle throat into a permanent rivet connection creating a high degree or structural integrity and then forms a surface bonding about the rivet periphery to effectively seal off any leakage path. The combination of these two securing stages has been found to produce a vastly superior result. The invention construction advantageously lends itself to securing closure assemblies to container lids molded of dissimilar plastic materials and different densities and melt indices beyond just those materials listed hereinbefore by way of example. Also alterations in the pail cover could be made so as to place the closure either in a recessed pocket or on a raised boss as is common in pail construction.

Various other changes in or modifications of the securing method of the invention would suggest themselves to those skilled in the art and could be made without departing from the spirit or scope of this invention. It is accordingly intended that all matter contained in the above description or shown in the accompanying drawing shall be interpreted as being illustrative and not in a limiting sense.

I claim:

1. A container closure combination comprising a container cover molded of synthetic plastic material, a closure receiving opening formed in said cover, an annular zone of predetermined uniform cross sectional thickness surrounding said opening, an annular raised step formed on the undersurface of said cover surrounding said zone creating a raised peripheral annular surface adjacent said zone, a closure permanently secured within said opening of said each having an upper flange overlying the upper surface of said annular zone, a throat portion disposed within said opening and an annular rivet head formation adjacent the undersurface of said zone, said rivet head formation extending radially outwardly in a thinned residual section terminating at said annular step and narrow annular bond between said rivet and said cover undersurface disposed radially inwardly of said step.

2. A container closure combination as in claim 1 said closure comprising an assembly including a nozzle member affixed to said container cover and a cap member engaged with said nozzle member.

3. A container closure combination as in claim 2 wherein said container cover and said cap member are molded of high density polyethylene and said nozzle member is molded of low density polyethylene.

4. A container closure combination as in claim 1 wherein said raised peripheral annular surface on said cover undersurface lies in a plane intermediate the axial extremity of said rivet head formation and said thinned residual section.

* * * * *

UNITED STATES PATENT AND TRADEMARK OFFICE
CERTIFICATE OF CORRECTION

PATENT NO.  : 5,221,028
DATED       : June 22, 1993
INVENTOR(S) : Davis B. Dwinell It is certified that error appears in the above-indentified patent and that said Letters Patent is hereby corrected as shown below:

Column 4:
Claim 1, line 67, "each" should read - cover-.

Signed and Sealed this

Fourteenth Day of June, 1994

Attest:

BRUCE LEHMAN

Attesting Officer

Commissioner of Patents and Trademarks